United States Patent
Danno et al.

(10) Patent No.: US 12,038,595 B2
(45) Date of Patent: Jul. 16, 2024

(54) LIGHT GUIDE MEMBER, LIGHTING DEVICE, AND DISPLAY DEVICE

(71) Applicant: OMRON Corporation, Kyoto (JP)

(72) Inventors: Masafumi Danno, Kyoto (JP); Masayuki Shinohara, Kyoto (JP); Norikazu Kitamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/802,725

(22) PCT Filed: Jan. 26, 2021

(86) PCT No.: PCT/JP2021/002537
§ 371 (c)(1),
(2) Date: Aug. 26, 2022

(87) PCT Pub. No.: WO2021/181917
PCT Pub. Date: Sep. 16, 2021

(65) Prior Publication Data
US 2023/0117548 A1    Apr. 20, 2023

(30) Foreign Application Priority Data
Mar. 13, 2020   (JP) ................................ 2020-044084

(51) Int. Cl.
*F21V 8/00*    (2006.01)

(52) U.S. Cl.
CPC .......... *G02B 6/0055* (2013.01); *G02B 6/0045* (2013.01)

(58) Field of Classification Search
CPC .......................... G02B 6/0055; G02B 6/0045
See application file for complete search history.

(56) References Cited

U.S. PATENT DOCUMENTS

| 5,786,665 A | 7/1998 | Ohtsuki et al. |
| 6,036,328 A | 3/2000 | Ohtsuki et al. |
| 6,415,531 B1 | 7/2002 | Ohtsuki et al. |
| (Continued) | | |

FOREIGN PATENT DOCUMENTS

| CN | 102116892 A | 7/2011 |
| CN | 107533237 A | 1/2018 |
| (Continued) | | |

OTHER PUBLICATIONS

An English translation of the International Search Report ("ISR") of PCT/JP2021/002537 mailed on Apr. 6, 2021.
(Continued)

*Primary Examiner* — Christopher E Dunay
(74) *Attorney, Agent, or Firm* — METROLEX IP LAW GROUP, PLLC

(57) ABSTRACT

Parallel light traveling in a direction perpendicular to an outgoing surface having a curved surface is emitted. A light guide member according to one or more embodiments may include: an incident surface where light from a light source enters; at least one reflective surface that reflects the light having entered from the incident surface; and an outgoing surface that is formed of a curved surface and emits the light reflected by the reflective surface. The reflective surface reflects the light having entered from the light source in a direction in which the incident angle of the light incident on the outgoing surface is constant.

20 Claims, 12 Drawing Sheets

(56) References Cited

U.S. PATENT DOCUMENTS

| | | | |
|---|---|---|---|
| 2003/0117789 A1 | 6/2003 | Nowak | |
| 2009/0316072 A1 | 12/2009 | Okumura et al. | |
| 2018/0017227 A1* | 1/2018 | Greene | G02B 6/001 |
| 2018/0067248 A1 | 3/2018 | Shinohara et al. | |
| 2019/0196090 A1 | 6/2019 | Mori et al. | |
| 2020/0018460 A1* | 1/2020 | Kitahara | F21V 7/0025 |
| 2020/0374995 A1* | 11/2020 | Bretschneider | F21V 23/04 |
| 2021/0033259 A1* | 2/2021 | Engelen | G02B 3/0056 |
| 2021/0180759 A1* | 6/2021 | Floc'h | F21S 43/247 |
| 2022/0136670 A1* | 5/2022 | Kemetmüller | F21S 41/322 |
| | | | 362/511 |

FOREIGN PATENT DOCUMENTS

| | | | |
|---|---|---|---|
| CN | 109563982 A | 4/2019 | |
| JP | 2004-022175 A | 1/2004 | |
| JP | 2007-171636 A | 7/2007 | |
| JP | 2008-123725 A | 5/2008 | |
| JP | 2010-092685 A | 4/2010 | |
| JP | 2018-55986 A | 4/2018 | |
| TW | 427476 U | 3/2001 | |

OTHER PUBLICATIONS

The Written Opinion("WO") of PCT/JP2021/002537 mailed on Apr. 6, 2021.
Chinese Office Action ("CNOA") issued on Feb. 2, 2024 in a counterpart Chinese patent application.

* cited by examiner

LIGHT GUIDE MEMBER, LIGHTING DEVICE, AND DISPLAY DEVICE

TECHNICAL FIELD

The present disclosure relates to a light guide member that guides incident light and emits the light as parallel light, a lighting device including the light guide member, and a display device.

BACKGROUND ART

Patent Document 1 discloses a light guide member for emitting parallel light and a lighting device including the light guide member. The light guide member includes an incident surface where light from a light source enters, a first reflective surface that totally reflects the light having entered from the incident surface, a second reflective surface that totally reflects the light totally reflected by the first reflective surface as parallel light, and an outgoing surface that emits the parallel light totally reflected by the second reflective surface.

PRIOR ART DOCUMENT

Patent Document

Patent Document 1: Japanese Unexamined Patent Publication No. 2018-055986 (published on Apr. 5, 2018)

SUMMARY

However, the light guide member disclosed in Patent Document 1 has a problem that when the outgoing surface is a curved surface, the incident angle of the light incident on the outgoing surface is not constant, and the light emitted from the outgoing surface is not emitted as parallel light.

A light guide member according to one or more embodiments may be capable of emitting light that is incident on an outgoing surface having a curved surface at a constant incident angle.

A light guide member according to one or more embodiments may include: an incident surface where light from a light source enters; at least one reflective surface configured to reflect the light having entered from the incident surface; and an outgoing surface formed of a curved surface and configured to emit the light reflected by the reflective surface. The reflective surface reflects the light having entered from the light source in a direction in which an incident angle of the light incident on the outgoing surface is constant.

According to one or more embodiments, it may be possible to achieve a light guide member capable of emitting light that is incident on an outgoing surface having a curved surface at a constant incident angle.

DETAILED DESCRIPTION

Hereinafter, an embodiment according to one aspect of the present invention (hereinafter also referred to as "the embodiment") will be described with reference to the drawings. However, the embodiment described below is merely an example of the present invention in all respects. It goes without saying that various improvements and modifications can be made without departing from the scope of the present invention. That is, in practicing the present invention, a specific configuration according to the embodiment may be adopted as appropriate.

§ 1 Application Example

Figure 1:
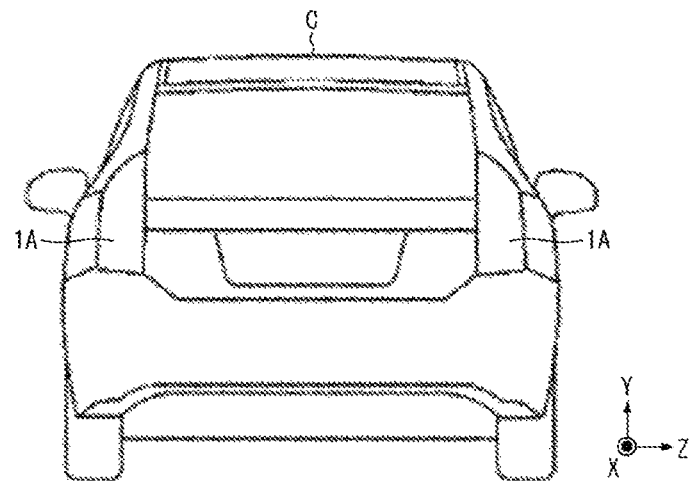
FIG. 1 a diagram illustrating an example of an application scene of a display device according to a first embodiment.
Figure 2:
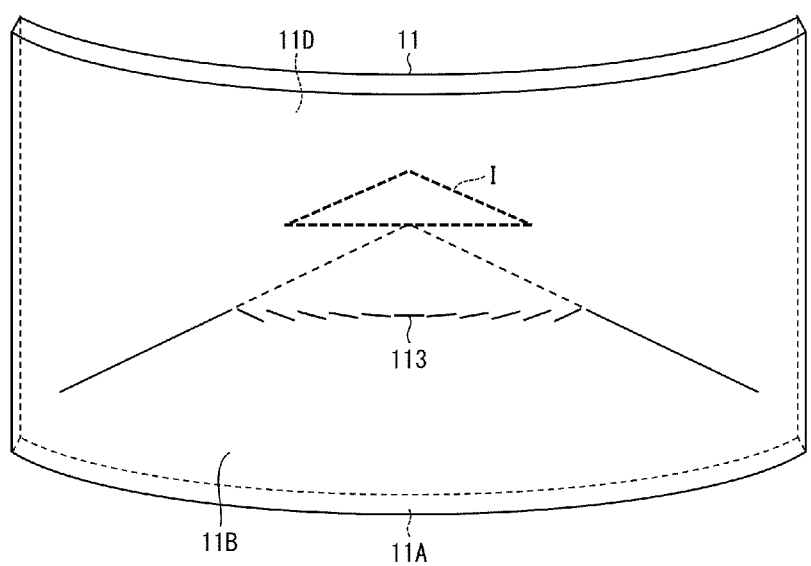
FIG. 2 is a diagram illustrating a view of a light guide plate of a display device as viewed from an observer.
Figure 3:
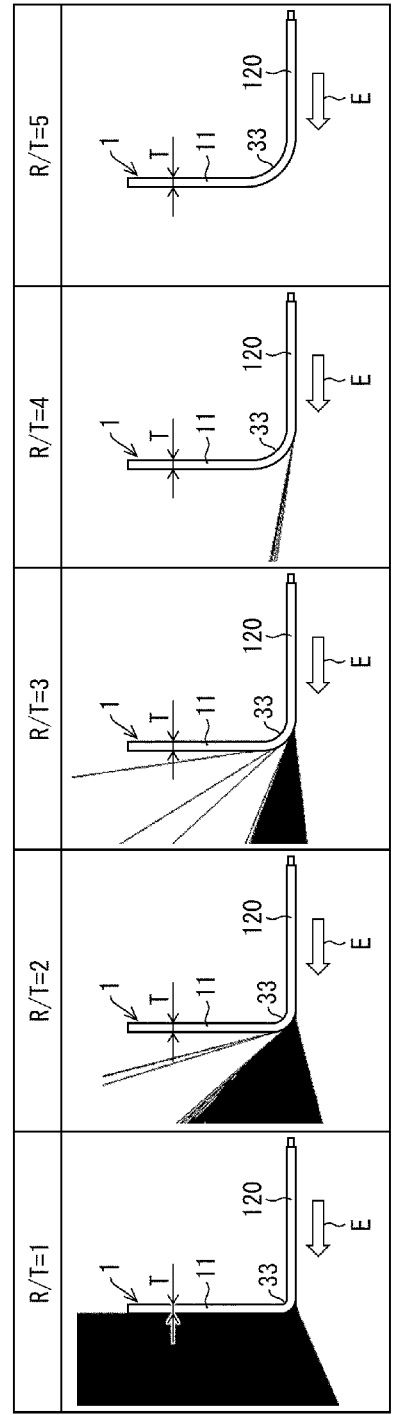
FIG. 3 is an explanatory diagram illustrating a connector of a display device according to a first embodiment.
Figure 4:
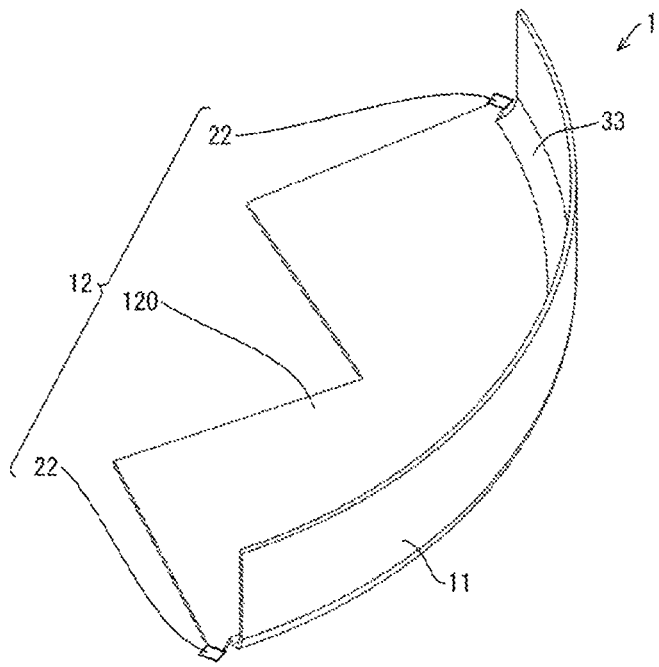
FIG. 4 is a diagram illustrating a perspective view of a display device according to a first embodiment.
Figure 5:
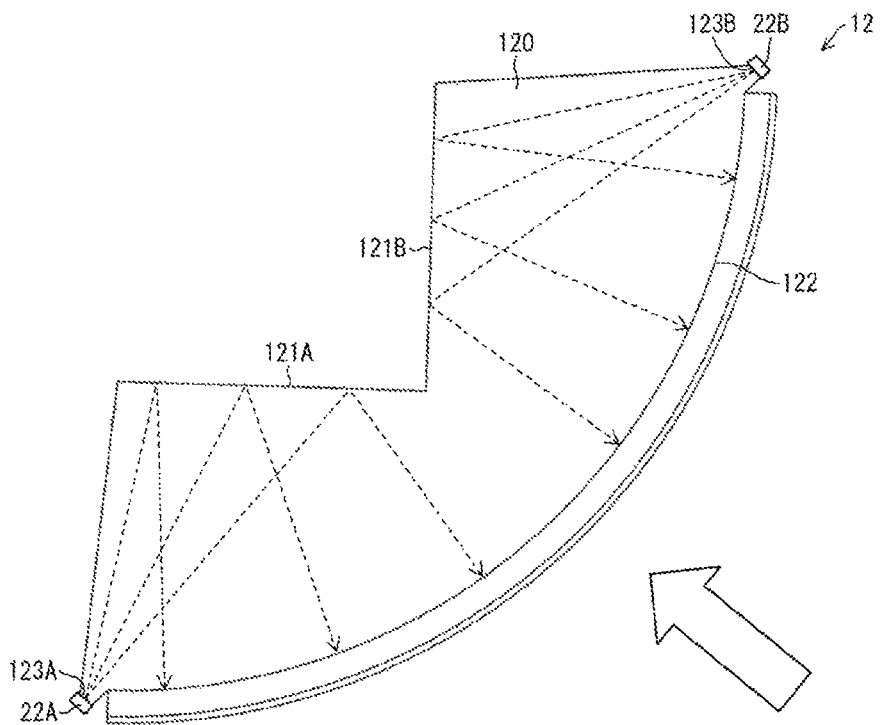
FIG. 5 is a diagram illustrating a plan view of a lighting device included in a display device.

First, an example of a scene to which the present invention is applied will be described with reference to FIGS. 1 to 5. FIG. 1 illustrates an example of an application scene of a display device 1 according to one embodiment of the present invention. FIG. 2 is a view of a light guide plate 11 included in the display device 1 as viewed from an observer outside a vehicle C. FIG. 3 is a diagram for explaining a connector 33 of the display device 1 according to the first embodiment. FIG. 4 is a perspective view of the display device 1. FIG. 5 is a plan view of a lighting device 12 included in display device 1. The display device 1 is a device for displaying a stereoscopic image inside the light guide plate 11 or in a space excluding the light guide plate 11. In this case, the display device 1 includes the light guide plate 11 and the lighting device 12 as illustrated in FIG. 4. As illustrated in FIG. 1, the display device 1 according to the embodiment can be applied to a tail lamp 1A of the vehicle C.

As illustrated in FIG. 2, a light exit surface 11B of the light guide plate 11 is formed of a curved surface. The light guide plate 11 is a member that changes an optical path of parallel light having entered from an incident surface 11A (cf. FIG. 5) by an optical path changing part group (optical path changing part) 113 formed in the light guide plate 11 to display a stereoscopic image I. As illustrated in FIGS. 3 and 4, the lighting device 12 includes a light source 22 and a light guide member 120. The lighting device 12 is a device for providing the light guide plate 11 with parallel light necessary for forming the stereoscopic image I. The light guide member 120 is a member for converting diffused light from the light source 22 into parallel light by making the light incident on an outgoing surface 122 at a constant incident angle.

The light guide member 120 according to the embodiment can convert the light from the light source 22 into parallel light traveling in a direction in which the incident angle of the light incident on the outgoing surface 122 formed of a curved surface is constant. For example, the light guide member 120 can convert the light from the light source 22 into parallel light traveling in a direction perpendicular to the outgoing surface 122 formed of the curved surface. The lighting device 12 including the light guide member 120 can provide the light guide plate 11 having the curved surface with parallel light necessary for forming the stereoscopic image I. Therefore, the display device 1 can form a stereoscopic image as intended. Specific configurations of the light guide plate 11 and the lighting device 12 will be described in detail below.

§ 2 Configuration Example

First Embodiment (Configuration of Display Device 1)

An exemplary display device 1 and an exemplary lighting device 12 according to the embodiment will be described with reference to FIGS. 2 to 5. FIG. 4 is a perspective view of the display device 1 according to the embodiment. As illustrated in FIG. 4, the display device 1 includes the lighting device 12, the connector 33, and the light guide plate 11. The display device 1 is disposed such that the convex surface of the light guide plate 11 forms a part of the outer surface of the vehicle C. That is, the lighting device 12 is stored inside the vehicle C.

The lighting device 12 is a device for emitting, to the light guide plate 11, light (hereinafter also referred to as parallel light) parallel to a direction perpendicular to the incident surface 11A (cf. FIG. 2) of the light guide plate 11, which will be described later. Details of the configuration of the lighting device 12 will be described later.

The connector 33 is a portion connecting the lighting device 12 and the light guide plate 11 and is formed of, for example, a transparent resin material such as a polycarbonate resin or a polymethyl methacrylate resin. The connector 33 connects the lighting device 12 and the light guide plate 11 such that the traveling direction of the light emitted from the lighting device 12 and the traveling direction of the light in the light guide plate 11 are substantially perpendicular, for example.

The connector 33 has a curvature with respect to the traveling direction of the light emitted from the lighting device 12 and can change the traveling direction. FIG. 3 is a diagram for explaining the connector 33 of the display device 1. In FIG. 3, R is the curvature radius of the connector 33, and T is the thickness of the light guide plate 11. FIG. 3 represents a difference in the degree of light leakage due to a difference in a value obtained by dividing R by T. An arrow E indicates the traveling direction of the light emitted from the lighting device 12. The filled portion in each figure in FIG. 3 represents light leaked from the connector 33. As illustrated in FIG. 3, the larger the curvature of the connector 33 (the smaller the curvature radius R), the larger the leakage of light from the connector 33. When the value of R/T is 3 or more, the leakage of light from the connector 33 is reduced sufficiently. When the value of R/T is 5 or more, light does not leak from the connector 33.

The light guide plate 11 is a member that deflects the parallel light, which has been emitted from the lighting device 12 and entered the light guide plate 11, inside the light guide plate 11 and emits the parallel light from the light exit surface 11B of the light guide plate 11. As a material for forming the light guide plate 11, for example, a polycarbonate resin, a polymethyl methacrylate resin, or the like can be used. As illustrated in FIG. 2, a plurality of optical path changing part groups 113 are formed on a back surface 11D of the light guide plate. The optical path changing part groups 113 are continuously formed along a line where a surface parallel to the incident surface 11A and the back surface 11D intersect. Each of optical path changing parts included in the optical path changing part group 113 is formed of a part of a Fresnel lens, and the convergence points of the respective optical path changing parts are different from each other. Thereby, as illustrated in FIG. 2, a virtual image as the stereoscopic image I is formed by a collection of the convergence points of the respective optical path changing parts. That is, in the display device 1, light enters the light guide plate 11 from the lighting device 12, and the optical path is deflected and emitted by the optical path changing part group 113 formed in the light guide plate 11, whereby the stereoscopic image I can be formed. As a result, the display device 1 can provide information to the observer outside the vehicle C and functions as the tail lamp and the brake lamp of the vehicle C.

The display device 1 forms the stereoscopic image I in a space inward of the light guide plate 11 in the vehicle C. This enables the brake lamp and the tail lamp to have a sense of depth.

(Configuration of Lighting Device 12)

FIG. 5 is a plan view of a lighting device 12 included in display device 1. As illustrated in FIG. 5, the lighting device 12 includes the light source 22 (may be referred to as a light source 22A and a light source 22B in the following description in order to distinguish the light sources 22) and the light guide member 120.

The light source 22 is a light source that allows light to enter the light guide member 120. The light source 22 is, for example, a light-emitting diode (LED) light source. The light source 22 may be a monochromatic LED light source or a combination of three types of LED light sources that emit red, green, and blue. When the light source 22 includes the LED light sources of three colors, the intensity of light emitted from each LED light source can be adjusted to emit light of various colors. Accordingly, the color of the stereoscopic image I can be changed in accordance with the application.

The light guide member 120 is a member for converting diffused light, having entered from the light source 22, into parallel light and emitting the parallel light. The light guide member 120 includes an incident surface 123 (123A and 123B), a reflective surface 121 (121A and 121B), and the outgoing surface 122. As a material for forming the light guide member 120, for example, a transparent resin material such as a polycarbonate resin or a polymethyl methacrylate resin can be used.

An incident surface 123A and an incident surface 123B are surfaces where light rays from the light source 22A and from the light source 22B enter, respectively.

The reflective surface 121A and the reflective surface 121B are surfaces for reflecting the light rays having entered from the incident surface 123A and the incident surface 123B, respectively, in the direction perpendicular to the outgoing surface 122. The reflective surface 121 has a planar structure and can function as a total reflective surface. In this case, at least some of the light having entered from the incident surface 123 is reflected by total reflection. That is, the reflective surface 121 can reduce the divergence of the light having entered from the incident surface 123 and can make constant the angle of the light incident on the outgoing surface. The amount of light reflected by total reflection depends on the absolute refractive index of the light guide member 120 and the angle of the light incident on the reflective surface 121. When the amount of light reflected by total reflection is small, a reflective layer can be formed on the reflective surface 121 by metal vapor deposition or the like. The formation of the reflective layer is not limited to metal vapor deposition, and the reflective layer may be formed by a technique such as sputtering or coating.

The outgoing surface 122 is a surface from which the light reflected by reflective surface 121 is emitted. Hereinafter, a direction parallel to the incident surface 123, the reflective surface 121, and the outgoing surface 122 (a direction perpendicular to the drawing plane in FIG. 5) will be described as a thickness direction. In the embodiment, the outgoing surface 122 forms, in a cross-section perpendicular to the thickness direction, a part of an arc centered at a point where the light ray incident on the outgoing surface 122 intersects when the light ray is extended in the direction of the reflective surface 121. In other words, the direction perpendicular to the outgoing surface described above is a direction perpendicular to a tangent of the arc (normal direction).

(Light Traveling Path)

Next, the traveling path of the light emitted from the light source 22 will be described with reference to FIGS. 5 and 6.

In FIG. 5, a broken line indicates the traveling path of the light in the lighting device 12. The light emitted from the light source 22A is normally diffused light, enters the light guide member 120 from the incident surface 123A, and reaches the reflective surface 121A. The light having reached the reflective surface 121A is reflected by the reflective surface 121A. Here, the light source 22A is disposed such that a point symmetric thereto with respect to the reflective surface 121A in a cross-section perpendicular to the thickness direction coincides with the center point of the arc. Hence the light reflected by the reflective surface 121A travels in the direction perpendicular to the outgoing surface 122 in the cross-section perpendicular to the thickness direction, and is emitted from the outgoing surface 122. That is, the light emitted by the light source 22 is converted into parallel light by the lighting device 12 and is emitted. The same applies to the light emitted from the light source 22B.

Figure 6:
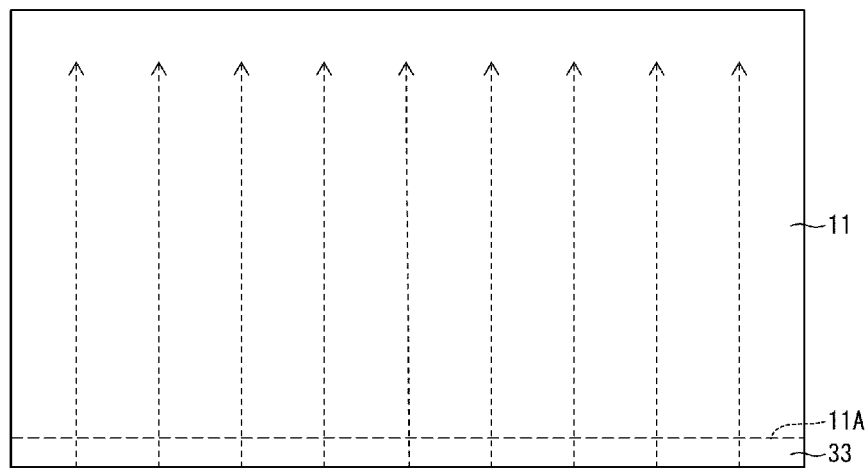
FIG. 6 is a diagram illustrating a traveling path of light emitted from a lighting device in a light guide plate.

FIG. 6 is a view illustrating the traveling path of the light emitted from the lighting device 12 in the light guide plate 11 and is a view of the light guide plate 11 viewed from a direction of an arrow illustrated in FIG. 5. In FIG. 6, a broken line indicates the traveling path of the light. The light emitted from the outgoing surface 122 enters the light guide plate 11 as parallel light in a direction perpendicular to the incident surface 11A of the light guide plate 11 via the connector 33 and travels in the light guide plate 11.

Effects of First Embodiment

As described above, the light guide member 120 in the embodiment includes (1) the incident surface 123 where the light from the light source 22 enters, (2) the reflective surface 121 that reflects the light having entered from the incident surface 123, and (3) the outgoing surface 122 that is formed of a curved surface and emits the light reflected by the reflective surface 121. The reflective surface 121 reflects the light having entered from the light source 22 in the direction perpendicular to the outgoing surface 122.

With the above configuration, the light from the light source 22 is reflected by the reflective surface 121 and travels in the direction perpendicular to the outgoing surface 122 having the curved surface. That is, the light from the light source 22 can be converted into parallel light by the light guide member 120.

In the light guide member 120 in the embodiment, the reflective surface 121 reflects the light having entered from the light source 22 in the direction perpendicular to the outgoing surface 122. With the above configuration, the light guide member 120 can convert the light from the light source 22 into parallel light.

In the light guide member 120 in the embodiment, when a direction parallel to the incident surface 123, the reflective surface 121, and the outgoing surface 122 is a thickness direction, the curved surface is an arc in a cross-sectional shape perpendicular to the thickness direction. The reflective surface 121 is a plane disposed such that a point symmetric to the light source 22 with respect to the reflective surface 121 coincides with the center point of the arc in the cross-sectional shape perpendicular to the thickness direction. With the above configuration, the reflective surface 121 is a plane, thus facilitating the manufacturing of the light guide member 120.

The light guide member 120 in the embodiment includes (1) the incident surface 123A and the incident surface 123B, and (2) the reflective surface 121A and the reflective surface 121B corresponding to the incident surface 123A and the incident surface 123B, respectively. The light rays reflected by reflective surface 121A and reflective surface 121B are emitted from different areas on the outgoing surface 122.

With the above configuration, the incident surface 123A and the incident surface 123B can be disposed at positions close to the light guide plate 11. In this structure, the depth of the light guide member 120 (the depth as viewed from the arrow direction in FIG. 3) can be shortened as compared with a case where the light source is disposed so as to be able to provide light perpendicular to the outgoing surface 122 of the light guide member 120 (e.g., a case where the light source is disposed at the center point of the arc described above).

The lighting device 12 in the embodiment includes the light guide member 120 and the light source 22. With the above configuration, the lighting device 12 can provide parallel light collimated in the direction perpendicular to the incident surface 11A of the light guide plate 11.

The display device 1 in the embodiment includes the lighting device 12 and the light guide plate 11 that guides light having entered from the lighting device 12, reflects the light by the optical path changing part group 113 formed at a predetermined position, and emits the light from the light exit surface 11B.

With the above configuration, in the display device 1, the light guide plate 11 forms an image in a space excluding the light guide plate 11 with the light that is emitted from the light exit surface 11B. Thereby, the display device 1 can form the stereoscopic image I as intended (i.e., the display device 1 can form a clear stereoscopic image I). However, in the display device 1, the light guide plate 11 may display a planar image inside the light guide plate 11 with the light that is emitted from the light exit surface 11B. In this case, the display device 1 can display a planar image.

That is, the display device 1 configured as described above is easy to manufacture and can provide the observer with the stereoscopic image I or the planar image in a simple and downsized shape.

In one aspect of the present invention, a configuration including a light guide member 130 and the connector 33 may be used as the light guide member. In this case, the light guide member includes the light guide member 130 and the connector 33 as an outgoing direction changing part that changes the traveling direction of the light emitted from the outgoing surface 122 to a direction parallel to the thickness direction. In this case, the outgoing surface of the light guide member is the surface of the connector 33 in contact with the light guide plate 11. The light guide member having the above configuration can emit the parallel light in the direction parallel to the thickness direction.

In the embodiment, the case has been exemplified where the display device 1 is applied as the tail lamp 1A of the vehicle C, but the present invention is not limited to this application. The display device 1 can also be applied to, for example, a game machine, a vehicle display device, an aerial switch, and the like.

Specifically, as an application example in the game machine, for example, the stereoscopic image I may be formed by the light guide plate 11 as at least one switch among a plurality of switches on an operation panel to be operated by a user. As an application example of the vehicle display device, for example, the display device 1 is used as a device for displaying a speedometer or the like, and the stereoscopic image I may be formed by the light guide plate 11. As an application example as the aerial switch, for example, the display device 1 is used for an input part of an elevator, and the stereoscopic image I may be formed by the light guide plate 11.

§ 3 Modifications

Although the embodiment of the present invention has been described in detail above, the above description is merely an example of the present invention in all respects. It goes without saying that various improvements and modifications can be made without departing from the scope of the present invention. For example, the following modifications are possible. Hereinafter, the same reference numerals are used for the same constituent elements as those in the above embodiment, and the same description as in the above embodiment is omitted as appropriate. The following modifications can be combined as appropriate.

<3.1>

Figure 7:
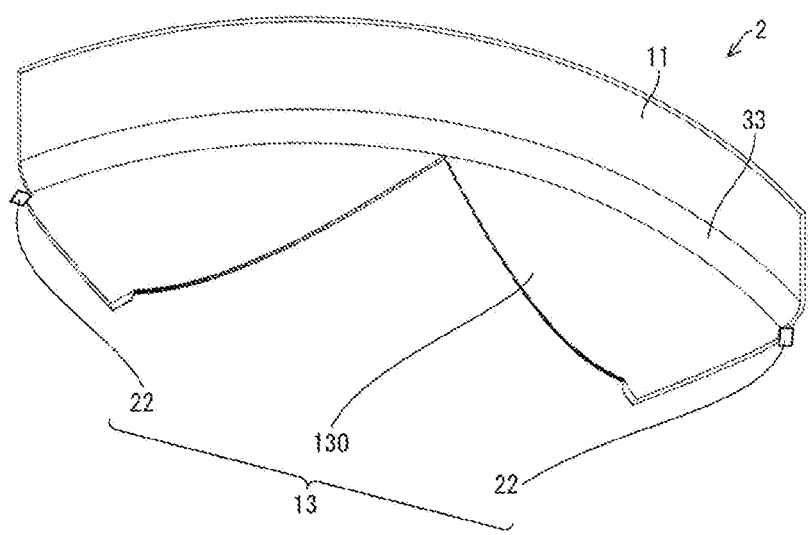
FIG. 7 is a diagram illustrating a perspective view of a modification of a display device.

A display device 2 as a modification of the display device 1 will be described with reference to FIGS. 7 to 9. FIG. 7 is a perspective view illustrating the display device 2. As illustrated in FIG. 7, the display device 2 includes a lighting device 13, the connector 33, and the light guide plate 11.

Figure 8:
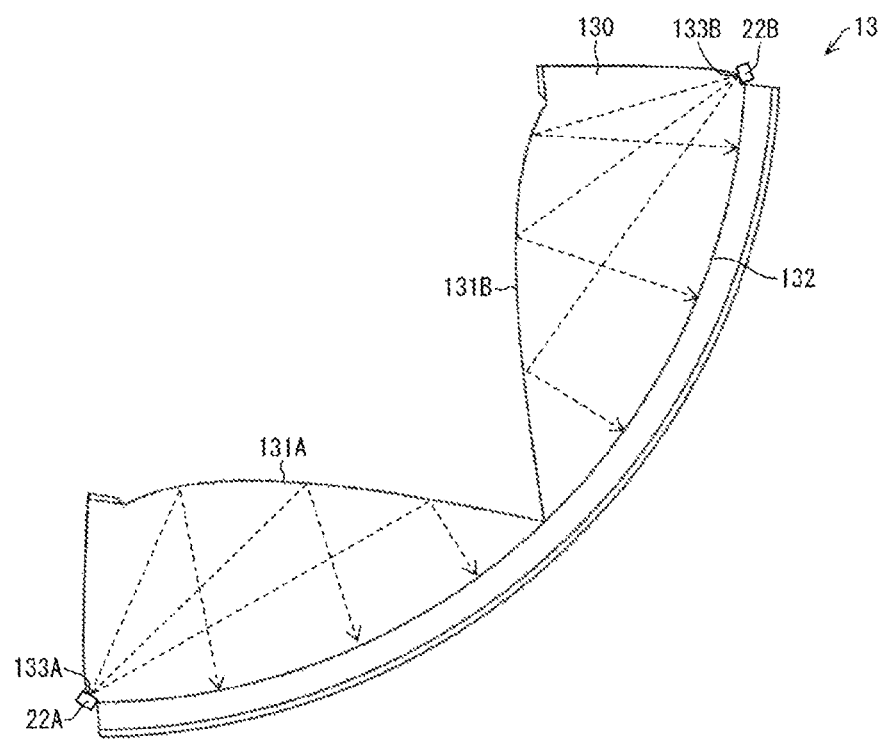
FIG. 8 is a diagram illustrating a plan view of a lighting device included in a modification of a display device.

FIG. 8 is a plan view of the lighting device 13 included in the display device 2. As illustrated in FIG. 8, the lighting device 13 includes the light source 22 (light source 22A and light source 22B) and the light guide member 130. The light guide member 130 includes an incident surface 133 (incident surface 133A and incident surface 133B), a reflective surface 131 (reflective surface 131A and reflective surface 131B), and an outgoing surface 132.

As illustrated in FIG. 8, the light guide member 130 is different from the light guide member 120 in that the reflective surface 131 (131A and 131B) has a curved surface. The outgoing surface 132 of the lighting device 13 forms a part of an arc. In the lighting device in the modification, the outgoing surface of the lighting device may be a curved surface except for an arc in a cross-section perpendicular to the thickness direction.

The reflective surface 131A and the reflective surface 131B are curved surfaces that are concave with respect to the outgoing surface 132. The reflective surface 131 can function as a total reflective surface. In this case, at least some of the light having entered from the incident surface 133 is reflected by total reflection. The amount of light reflected by total reflection depends on the absolute refractive index of the light guide member 130 and the angle of the light incident on the reflective surface 121. When the amount of light reflected by total reflection is small, metal vapor deposition can also be applied to the reflective surface 121. The reflective surface 131A and the reflective surface 131B are made up of a plurality of surfaces, which reflect light rays having entered from the incident surface 133 at different angles, and can each be formed of a Fresnel lens, for example. As indicated by broken lines in FIG. 8, diffused light rays emitted from the light source 22A and the light source 22B enter the light guide member 130 from the incident surface 133A and the incident surface 133B and reach the reflective surface 131A and the reflective surface 131B. The light rays having reached the reflective surface 131A and the reflective surface 131B are reflected by the plurality of surfaces to be reflected in a direction perpendicular to the outgoing surface 132 and are emitted from the outgoing surface 132. That is, the light emitted by the light source 22 is converted into parallel light by the light guide member 130 and is emitted.

Figure 9:
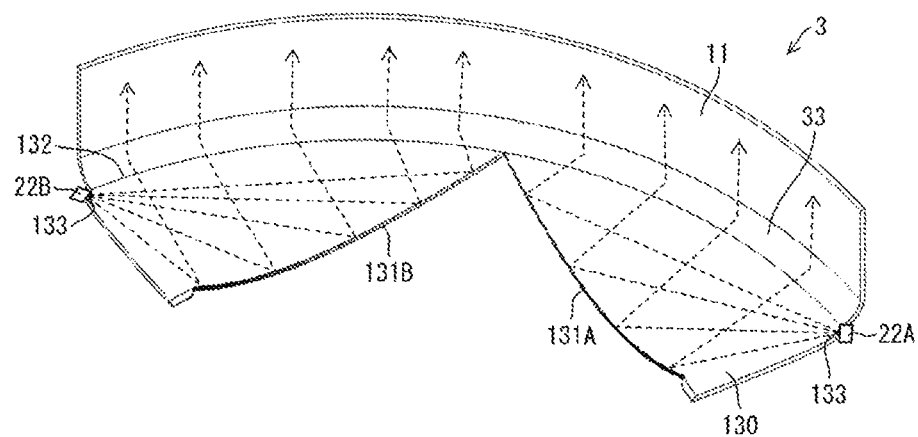
FIG. 9 is a diagram illustrating a perspective view of a modification of a display device.

FIG. 9 is a perspective view of the display device 2. In FIG. 9, broken lines indicate the traveling paths of the light rays emitted from the light source 22A and the light source 22B in the display device 2. As illustrated in FIG. 9, the light emitted from the outgoing surface 132 of the light guide member 130 perpendicularly to the outgoing surface 132 enters the light guide plate 11 as parallel light in a direction perpendicular to the incident surface (not illustrated) of the light guide plate 11 via the connector 33.

With the above configuration, the lighting device 13 can provide collimated parallel light to the light guide plate 11.

By having a curved line in the cross-section perpendicular to the thickness direction, the reflective surface 131 of the light guide member 130 can provide continuous light without a dark line to the outgoing surface 132. In addition, by the lighting device 13 including the reflective surface 131, the depth of the lighting device 13 can be shortened for the same reason as the lighting device 12 of the first embodiment.

<3.2>

Figure 10:
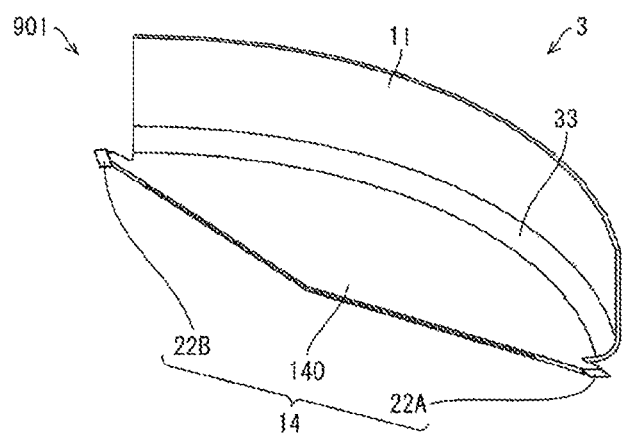
FIG. 10 is a diagram illustrating a perspective view of a modification of a display device and a plan view of a lighting device.
Figure 10:
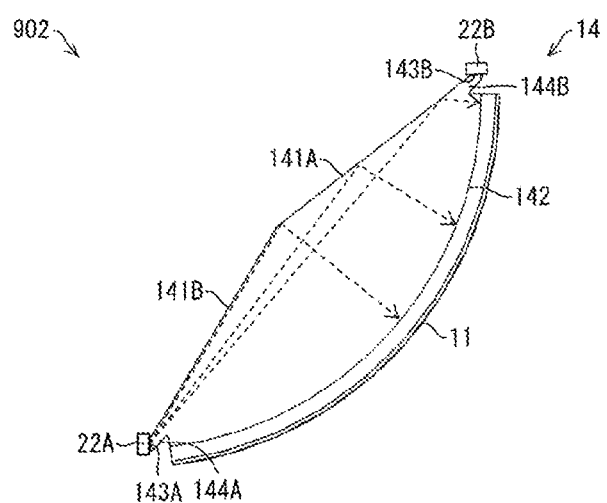

Reference numeral 901 in FIG. 10 is a perspective view illustrating a display device 3 as a modification of the display device 1 in the first embodiment. As illustrated in FIG. 10, the display device 3 includes a lighting device 14, the connector 33, and the light guide plate 11.

Reference numeral 902 in FIG. 10 is a plan view of the lighting device 14 included in the display device 3. As illustrated in FIG. 10, the lighting device 14 includes two light sources 22 (light source 22A and light source 22B) and a light guide member 140. The light guide member 140 includes an incident surface 143 (143A and 143B), a reflective surface 141 (141A and 141B), and an outgoing surface 142.

As illustrated in FIG. 10, the light guide member 140 is different from the light guide member 120 in that the shape of the reflective surface formed of two reflective surface 141A and the reflective surface 141B is concave with respect to the outgoing surface 142. Further, a light limiter 144A and a light limiter 144B are formed between the light guide member 140 and the incident surface 143A and between the light guide member 140 and the incident surface 143B, respectively.

Each of the light limiters 144A, 144B has a shape formed by elongating the end of the light guide member 140 and plays a role of limiting the light guide angle of the light having entered from the incident surface 143. Specifically, the light limiter 144A, and the light limiter 144B limit the ranges of the light rays emitted from the light source 22A and the light source 22B such that the light rays emitted from the light sources 22A, 22B are applied only to the corresponding reflective surface 141. The provision of the light limiter 144 configured as described above makes it possible to prevent the light source 22A and the light source 22B from being applied to the reflective surfaces except for the corresponding reflective surface 141. It is thereby possible to prevent the generation of stray light.

Each of the reflective surface 141A and the reflective surface 141B has a planar structure and can function as a total reflective surface. In this case, at least some of the light having entered from the incident surface 143 is reflected by total reflection. The amount of light reflected by total reflection depends on the absolute refractive index of the light guide member 140 and the angle of the light incident on the reflective surface 141. When the amount of light reflected by total reflection is small, metal vapor deposition can also be applied to the reflective surface 121. As indicated by broken lines in FIG. 10, diffused light rays emitted from the light source 22A and the light source 22B enter the light guide member 140 from the incident surface 143A and the incident surface 143B and reach the reflective surface 141A and the reflective surface 141B. The light having reached each of the reflective surface 141A and the reflective surface 141B is reflected in a direction perpendicular to the outgoing surface 142 and is emitted from the outgoing surface 142. That is, the light emitted by the light source 22 is converted into parallel light by the light guide member 140 and is emitted.

As described above, the light guide member 140 in the embodiment includes the light limiter 144A, and the light limiter 144B that limit the ranges of the light rays having entered from the incident surface 143A and the incident surface 143B such that the light rays having entered from the incident surface 143A and the incident surface 143B are applied only to the corresponding reflective surface 141A and reflective surface 141B, respectively.

With the above configuration, by including the light limiter 144, the light guide member 140 can prevent the generation of stray light. Moreover, with the above configuration, the light from the light source 22 is reflected once by the reflective surface 121 to become light traveling in the direction perpendicular to the outgoing surface 142 having the curved surface, whereby the light can be converted into parallel light.

<3.3>

Figure 11:
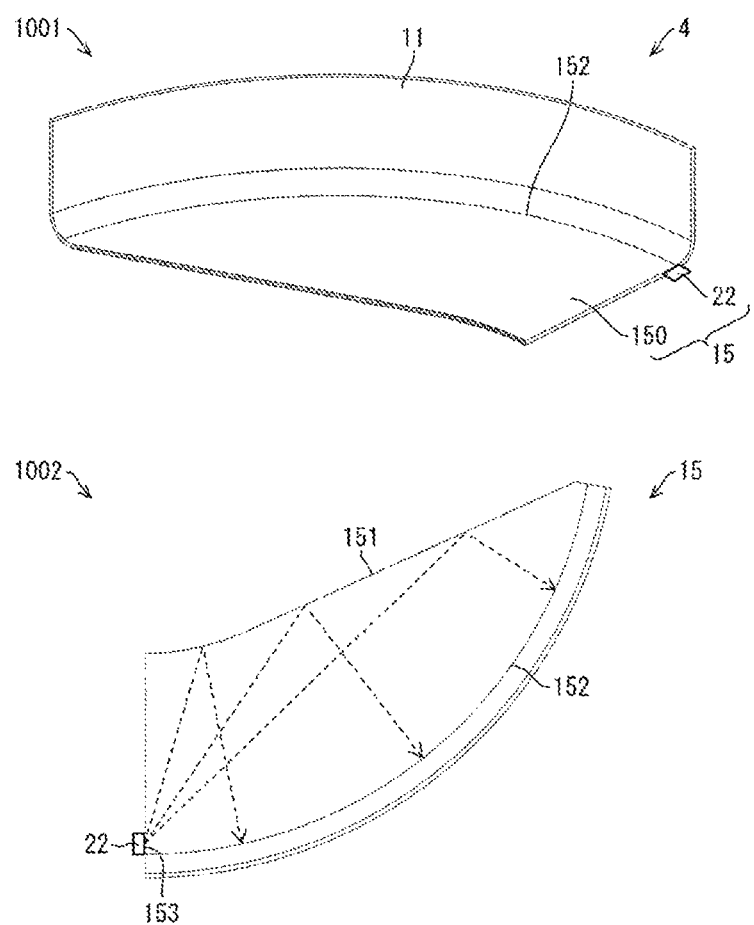
FIG. 11 is a diagram illustrating a perspective view of a modification of a display device and a plan view of a lighting device.

Reference numeral 1001 in FIG. 11 is a perspective view illustrating a display device 4 as a modification of the display device 1. As illustrated in FIG. 11, the display device 4 includes a lighting device 15, the connector 33, and the light guide plate 11.

Reference numeral 1002 in FIG. 11 is a plan view of the lighting device 15 included in the display device 4. As illustrated in FIG. 11, the lighting device 15 includes the light source 22 and a light guide member 150. The light guide member 150 includes an incident surface 153, a reflective surface 151, and an outgoing surface 152.

As illustrated in FIG. 11, the light guide member 150 is different from the light guide member 120 in the number of light sources 22 being one, and in the shape of the reflective surface 151. The reflective surface 151 is formed of a curved surface that is convex with respect to the incident direction of the light from the light source 22. The shape of the curved surface is a shape for reflecting the light having entered from the light source 22 in a direction perpendicular to the outgoing surface 152. A distance until the light reflected by the reflective surface 151 reaches the outgoing surface 152 becomes shorter as a position at which the light is reflected by the reflective surface 151 becomes farther from the light source 22. The reflective surface 151 is formed such that a straight line connecting an arbitrary point of the reflective surface 151 and the light source 22 intersects the reflective surface 151 only at the arbitrary point. Specifically, the end of the reflective surface 151 facing the light source 22 is designed such that the distance between the reflective surface 151 and the outgoing surface 152 is short. This enables all the light emitted from the light source 22 to be applied to the reflective surface 151, so that the light can be emitted in all the areas of the outgoing surface 152 in the cross-section perpendicular to the thickness direction.

The reflective surface 151 can function as a total reflective surface. In this case, at least some of the light having entered from the incident surface 153 is reflected by total reflection. The amount of light reflected by total reflection depends on the absolute refractive index of the light guide member 150 and the angle of the light incident on the reflective surface 151. When the amount of light reflected by total reflection is small, metal vapor deposition can also be applied to the reflective surface 151.

As indicated by broken lines in reference numeral 1002 of FIG. 11, the diffused light emitted from the light source 22 enters the light guide member 150 from the incident surface 153 and reaches the reflective surface 151. The light having reached the reflective surface 151 is reflected in the direction perpendicular to the outgoing surface 152 and is emitted from the outgoing surface 152. That is, the light emitted by the light source 22 is converted into parallel light by the light guide member 160 and is emitted.

As described above, the light guide member 150 in the embodiment includes only one incident surface 153.

With the above configuration, the light guide member 150 can avoid interference with other light sources. The lighting device 15 may provide collimated parallel light to the light guide plate 11. In addition, by the lighting device 15 including the reflective surface 151, the depth of the reflective surface 151 can be shortened for the same reason as the lighting device 12 of the first embodiment.

<3.4>

Figure 12:
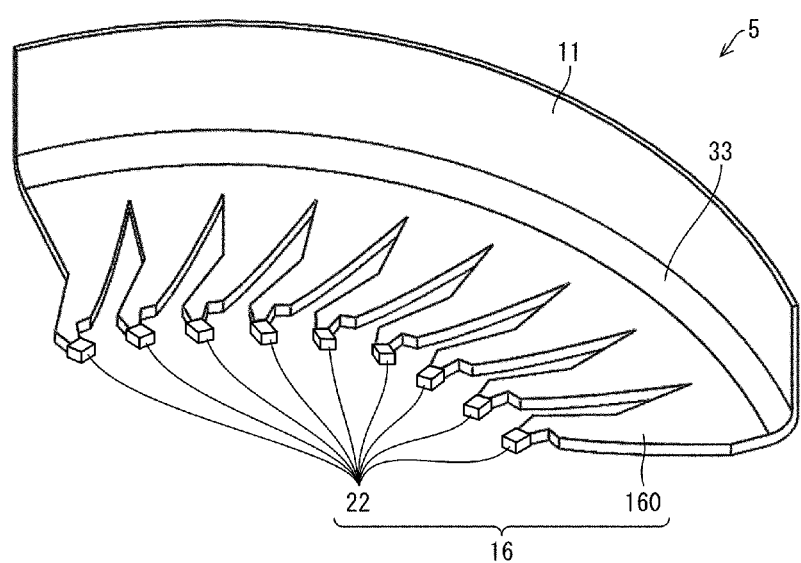
FIG. 12 is a diagram illustrating a perspective view of a modification of a display device.

FIG. 12 is a perspective view illustrating a display device 5 as a modification of the display device 1. As illustrated in FIG. 12, the display device 5 includes a lighting device 16, the connector 33, and the light guide plate 11.

Figure 13:
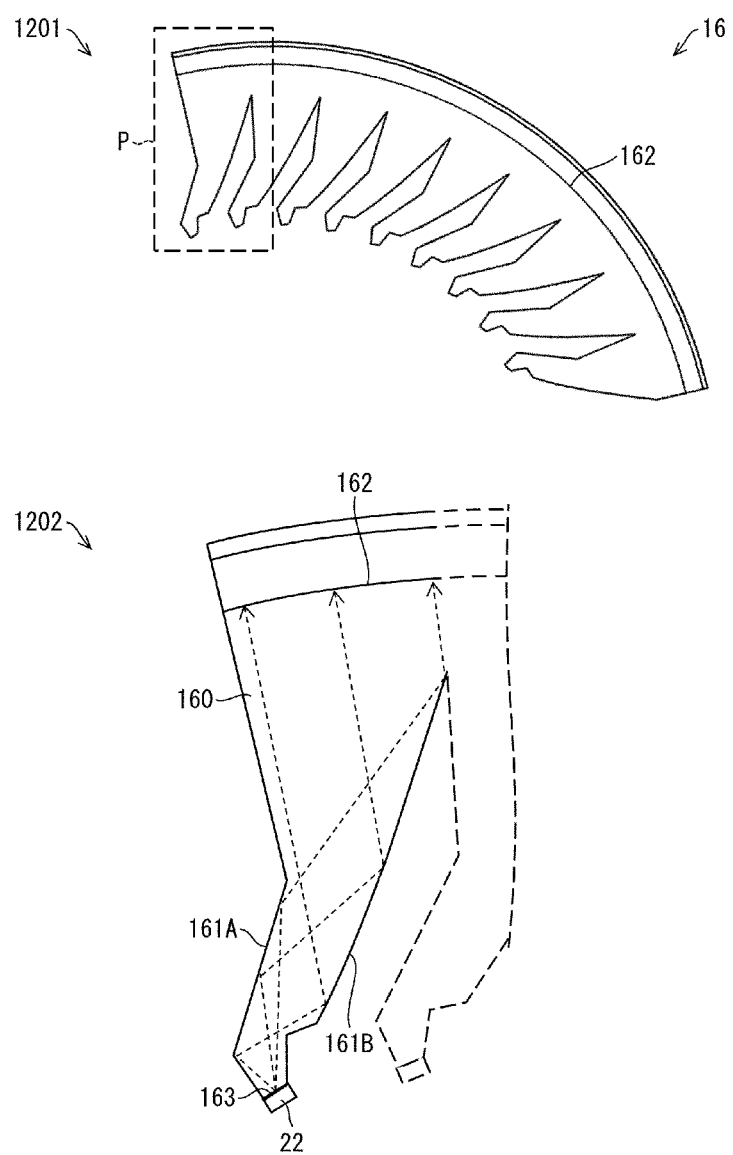
FIG. 13 is a diagram illustrating a plan view of a lighting device included in a modification of a display device.

FIG. 13 is a plan view of the lighting device 15 included in the display device 5. Reference numeral 1201 in FIG. 13 illustrates an overall view of the lighting device 16, and reference numeral 1202 is an enlarged view of a portion surrounded by a frame P in reference numeral 1201. As illustrated in FIG. 13, the lighting device 16 includes the light source 22 and a light guide member 160. The light guide member 160 includes an incident surface 163, a first reflective surface 161A, a second reflective surface 161B, and an outgoing surface 162.

As illustrated in FIG. 13, the light guide member 160 is different from the light guide member 120 in that a light guide member unit (a portion indicated by reference numeral 1202 in FIG. 13) having one incident surface has a continuous shape. The light guide member unit is different from the light guide member 120 in that the light guide member unit includes the first reflective surface 161A and the second reflective surface 161B.

The first reflective surface 161A is a surface for reflecting the light having entered from the incident surface 163 toward the second reflective surface 161B. The second reflective surface 161B is a surface for reflecting the light reflected by the first reflective surface 161A in a direction perpendicular to the outgoing surface 162.

The first reflective surface 161A can function as a total reflective surface. In this case, at least some of the light having entered from the incident surface 163 is reflected by total reflection. The second reflective surface 161B is formed of a curved surface that is concave with respect to the incident direction of the light reflected by the first reflective surface 161A. The shape of the curved surface is formed so as to reflect the light reflected by the first reflective surface 161A in the direction perpendicular to the outgoing surface in the cross-section perpendicular to the thickness direction. The second reflective surface 161B can function as a total reflective surface. In this case, at least some of the light reflected by the first reflective surface 161A is reflected by total reflection. The amount of light reflected by total reflection on each of the first reflective surface 161A and the second reflective surface 161B depends on the absolute refractive index of the light guide member 160 and the angle of light incident on each of the first reflective surface 161A and the second reflective surface 161B. When the amount of light reflected by total reflection is small, metal vapor deposition can be applied to the first reflective surface 161A and/or the second reflective surface 161B.

As indicated by broken lines in reference numeral 1202 of FIG. 13, the diffused light emitted from the light source 22 enters the light guide member 150 from the incident surface 163, reaches the first reflective surface 161A, and is reflected in the direction of the second reflective surface 161B. The light reflected by the first reflective surface 161A is reflected by the second reflective surface 161B in the direction perpendicular to the outgoing surface 162 and is emitted from the outgoing surface 162. That is, the light emitted by the light source 22 is converted into parallel light by the light guide member 160 and is emitted.

With the above configuration, the lighting device 15 can provide collimated parallel light to the light guide plate 11.

<3.5>

Figure 14:
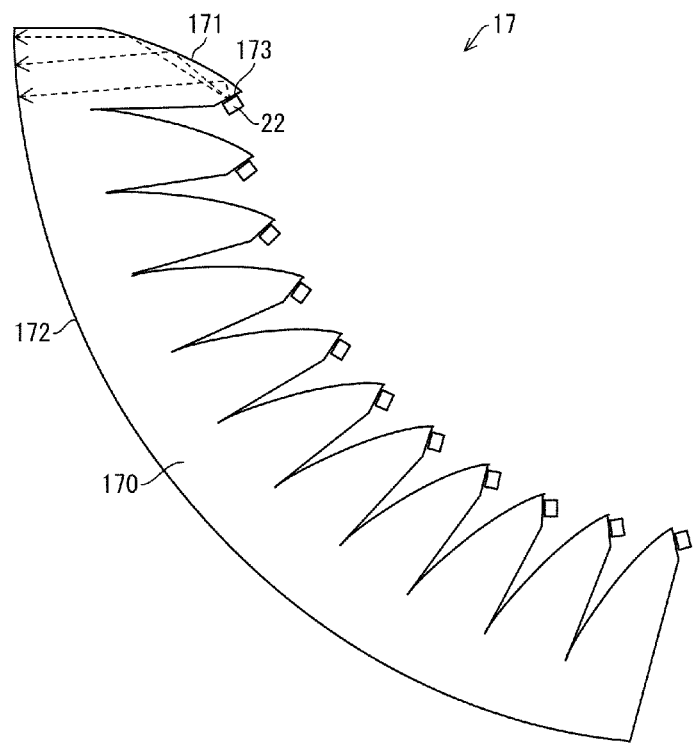
FIG. 14 is a diagram illustrating a plan view of a modification of a light guide member.

FIG. 14 is a plan view illustrating a lighting device 17 according to a modification of the light guide member 120. As illustrated in FIG. 14, the lighting device 17 includes a light guide member 170 instead of the light guide member 160 described above. The light guide member 170 includes an incident surface 173, a reflective surface 171, and an outgoing surface 172.

As illustrated in FIG. 14, the light guide member 170 is different from the light guide member 120 in that the light guide member unit having one incident surface 173 has a continuous shape. The light guide member unit is different from that of the light guide member 160 in that the light is reflected in the direction perpendicular to the outgoing surface 172 by one reflection by the reflective surface 171.

The reflective surface 171 is formed of a curved surface that is concave with respect to the incident direction of the light having been emitted from the light source 22 and entered from the incident surface 173. The shape of the curved surface is a shape for reflecting the light reflected by the reflective surface 171 in the direction perpendicular to the outgoing surface 172. The reflective surface 171 can function as a total reflective surface. In this case, at least some of the light reflected by the reflective surface 171 is reflected by total reflection. The amount of light reflected by total reflection depends on the absolute refractive index of the light guide member 170 and the angle of the light incident on the reflective surface 171. When the amount of light reflected by total reflection is small, metal vapor deposition can also be applied to the reflective surface 171.

As indicated by broken lines in FIG. 14, the diffused light having entered the light guide member 170 from the incident surface 173 is reflected by the reflective surface 171 in the direction perpendicular to the outgoing surface 172 and is emitted from the outgoing surface 172.

With the above configuration, the light emitted by the light source 22 is converted into parallel light by the light guide member 170 and is emitted.

A light guide plate 110 as a modification of the display device 1 will be described with reference to FIGS. 15 to 20.

Figure 15:
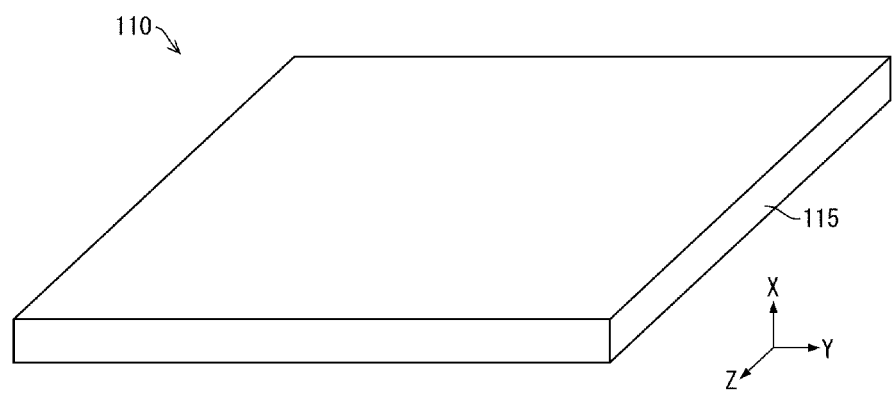
FIG. 15 is a diagram illustrating a perspective view of a light guide plate.
Figure 16:
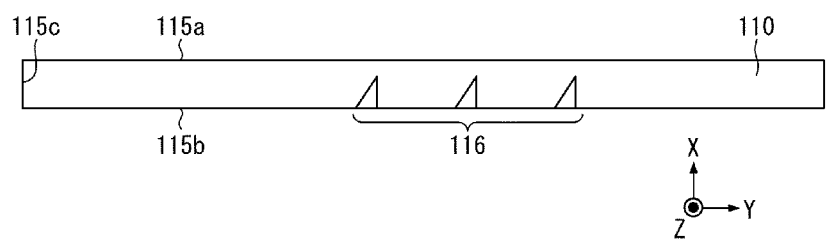
FIG. 16 is a diagram illustrating a cross-sectional view of a configuration of a light guide plate.
Figure 17:
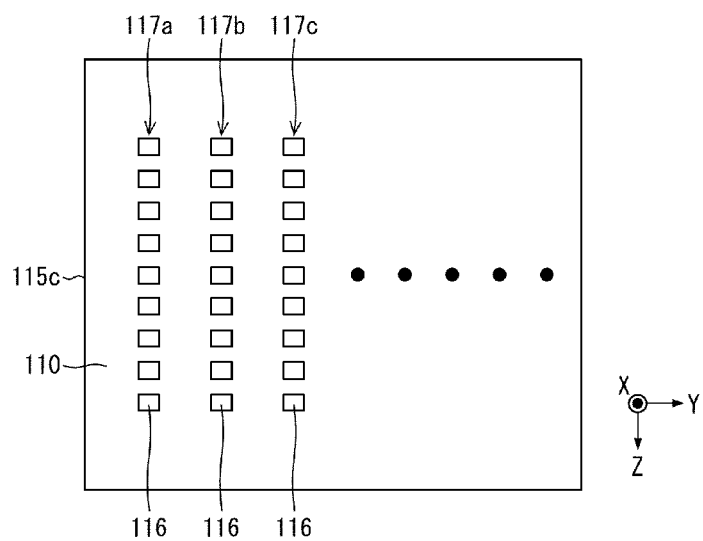
FIG. 17 is a diagram illustrating a plan view of a configuration of a light guide plate.
Figure 18:
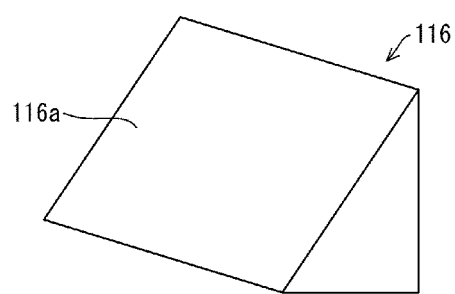
FIG. 18 is a diagram illustrating a perspective view of a configuration of an optical path changing part included in a light guide plate.

FIG. 15 is a perspective view of the light guide plate 110. FIG. 16 is a cross-sectional view illustrating the configuration of the light guide plate 110. FIG. 17 is a plan view illustrating the configuration of the light guide plate 110. FIG. 18 is a perspective view illustrating a configuration of an optical path changing part 116 included in the light guide plate 110.

The light guide plate 110 is a member that guides light (incident light) having entered from the lighting device (not illustrated). The light guide plate 110 is formed of a transparent resin material with a relatively high refractive index. As a material for forming the light guide plate 110, for example, a polycarbonate resin, a polymethyl methacrylate resin, or the like can be used. In the modification, the light guide plate 110 is formed of a polymethyl methacrylate resin. As illustrated in FIG. 15, the light guide plate 110 includes an outgoing surface 115a (light exit surface), a back surface 115b, and an incident surface 115c.

The outgoing surface 115a is a surface from which light is emitted, the light having been guided inside the light guide plate 110 and changed in its optical path by the optical path changing part 116 to be described later. The outgoing surface 115a constitutes the front surface of the light guide plate 110. The back surface 115b is a surface parallel to the outgoing surface 115a and is a surface on which the optical path changing part 116 to be described later is disposed. The incident surface 115c is a surface where light emitted from a lighting device (not illustrated) enters the light guide plate 110.

The light having entered the light guide plate 110 from the incident surface 115c is totally reflected by the outgoing surface 115a or the back surface 115b and guided in the light guide plate 110.

As illustrated in FIG. 16, the optical path changing part 116 is a member that is formed on the back surface 115b inside the light guide plate 110, changes the optical path of the light guided in the light guide plate 110, and emits the light from the outgoing surface 115a. A plurality of optical path changing parts 116 are provided on the back surface 115b of the light guide plate 110.

As illustrated in FIG. 17, the optical path changing parts 116 are provided along a direction parallel to the incident surface 115c. As illustrated in FIG. 18, the optical path changing part 116 has a triangular pyramid shape and includes a reflective surface 116a that reflects (totally reflects) incident light. The optical path changing part 116 may be, for example, a recess formed on the back surface 115b of the light guide plate 110. The optical path changing part 116 is not limited to the triangular pyramid shape. As illustrated in FIG. 17, a plurality of optical path changing part groups 117a, 117b, 117c, . . . each made up of a plurality of optical path changing parts 116 are formed on the back surface 115b of the light guide plate 110.

Figure 19:
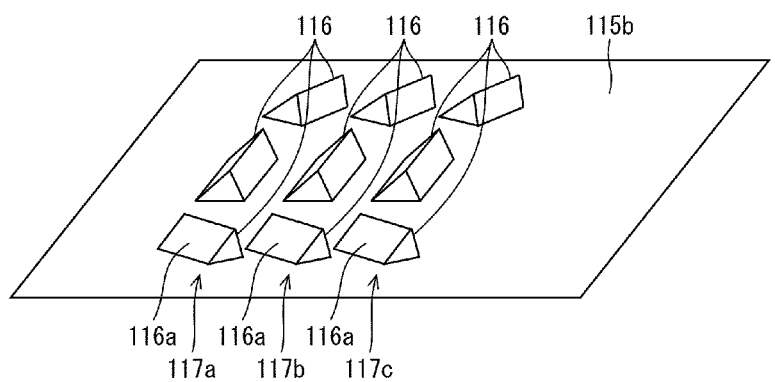
FIG. 19 is a diagram illustrating a perspective view of an arrangement of an optical path changing parts.

FIG. 19 is a perspective view illustrating the arrangement of the optical path changing parts 116. As illustrated in FIG. 19, in each of the optical path changing part groups 117a, 117b, 117c, . . . , the reflective surfaces 116a of the plurality of optical path changing parts 116 are arranged on the back surface 115b of the light guide plate 110 such that the angles with respect to the incident direction of light are different from each other. Thereby, each of the optical path changing part groups 117a, 117b, 117c, . . . changes the optical path of the incident light and emits the incident light from the outgoing surface 115a in various directions.

Next, a method of forming the stereoscopic image I by the light guide plate 110 will be described with reference to FIG. 20. Here, a case will be described where the stereoscopic image I as a plane image is formed on a stereoscopic image formed plane P, which is a plane perpendicular to the outgoing surface 115a of the light guide plate 110, by the light changed in its optical path by the optical path changing part 116.

Figure 20:
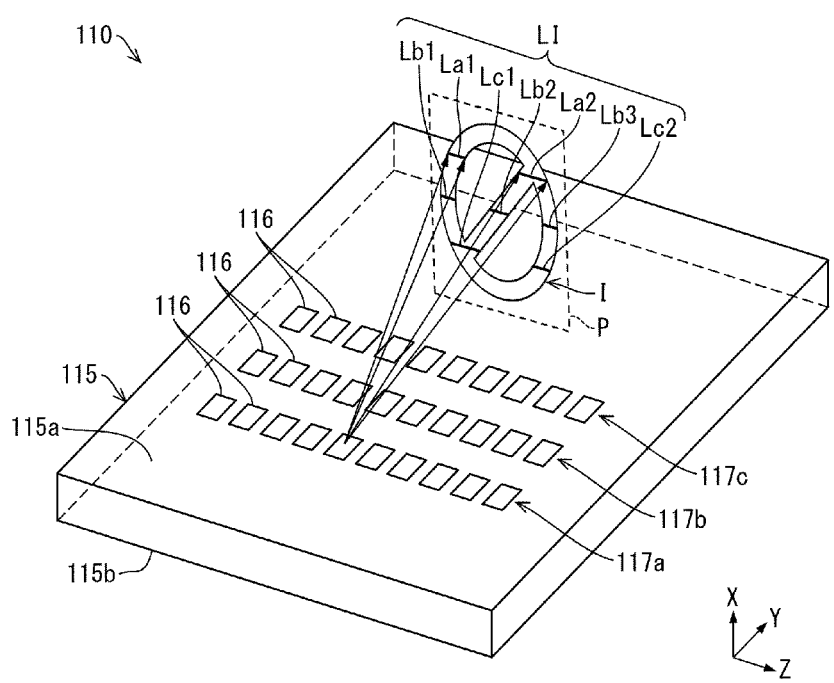
FIG. 20 is a diagram illustrating a perspective view of a method of forming a stereoscopic image by a light guide plate.

FIG. 20 is a perspective view illustrating the method of forming the stereoscopic image I by the light guide plate 110. Here, a description will be given of the formation of a ring mark with a diagonal line as the stereoscopic image I on the stereoscopic image formed plane P.

In the light guide plate 110, as illustrated in FIG. 20, for example, light rays changed in the optical paths thereof by the optical path changing parts 116 of the optical path changing part group 117a intersect with the stereoscopic image formed plane P on a line La1 and a line La2. Thereby, line images LI, each being a part of the stereoscopic image I, is formed on the stereoscopic image formed plane P. The line image LI is a line image parallel to the YZ plane. In this way, the line images LI of the line La1 and the line La2 are formed by the light rays from many optical path changing parts 116 belonging to the optical path changing part group 117a. Note that the light rays for forming the images of the line La1 and the line La2 may be provided by at least two optical path changing part 116 in the optical path changing part group 117a.

Likewise, light rays changed in the optical paths thereof by the optical path changing parts 116 of the optical path changing part group 117b intersect with the stereoscopic image formed plane P on a line Lb1, a line Lb2, and a line Lb3. Thereby, line images LI, each being a part of the stereoscopic image I, is formed on the stereoscopic image formed plane P.

The light rays changed in the optical paths thereof by the optical path changing parts 116 of the optical path changing part group 117c intersect with the stereoscopic image formed plane P on a line Lc1 and a line Lc2. Thereby, line images LI, each being a part of the stereoscopic image I, is formed on the stereoscopic image formed plane P.

The positions in the X-axis direction of the line images LI formed by the optical path changing part groups 117a, 117b, 117c, . . . are different from each other. In the light guide plate 110, by reducing the distance between the optical path changing part groups 117a, 117b, 117c, . . . , the distance in the X-axis direction of the line images LI formed by the optical path changing part groups 117a, 117b, 117c, . . . can be reduced. As a result, the light guide plate 110 accumulates a plurality of line images LI formed by the light rays changed in the optical paths thereof by the optical path changing parts 116 of the optical path changing part groups 117a, 117b, 117c, . . . , thus substantially forming the stereoscopic image I, which is a plane image, on the stereoscopic image formed plane P.

The stereoscopic image formed plane P may be a plane perpendicular to the X-axis, a plane perpendicular to the Y-axis, or a plane perpendicular to the Z-axis. Further, the stereoscopic image formed plane P may be a plane that is not perpendicular to the X-axis, the Y-axis, or the Z-axis. Moreover, the stereoscopic image formed plane P may be a curved surface instead of a plane. That is, the light guide plate 110 can cause the optical path changing part 116 to form the stereoscopic image I on an arbitrary plane (plane surface and curved surface) on the space. By combining a plurality of plane images, a three-dimensional image can be formed.

In each of the above-described embodiments, the case where the light incident on the outgoing surface is perpendicularly incident on the outgoing surface has been described as an example, but it is sufficient that the incident angle of the light incident on the outgoing surface be constant.

SUMMARY

A light guide member according to one aspect of the present invention includes: an incident surface where light from a light source enters; at least one reflective surface configured to reflect the light having entered from the incident surface; and an outgoing surface formed of a curved surface and configured to emit the light reflected by the reflective surface. The reflective surface reflects the light having entered from the light source in a direction in which an incident angle of the light incident on the outgoing surface is constant.

With the above configuration, the light from the light source is reflected by the reflective surface and travels in a direction having a constant incident angle with respect to the outgoing surface having the curved surface. That is, the light from the light source can be converted into parallel light by the light guide member.

In the light guide member according to one aspect of the present invention, the reflective surface reflects the light having entered from the light source in the direction perpendicular to the outgoing surface.

With the above configuration, the light from the light source is reflected by the reflective surface and travels in the direction perpendicular to the outgoing surface having the curved surface. That is, the light from the light source can be converted into parallel light by the light guide member.

In the light guide member according to one aspect of the present invention, the reflective surface includes a plurality of surfaces, each of which reflects the light having entered from the incident surface at a different angle.

With the above configuration, by reflecting light rays in directions different from each other by the plurality of surfaces, the light having entered from the light source can be reflected in a direction in which the incident angle of the light incident on the outgoing surface is constant.

In the light guide member according to one aspect of the present invention, when a direction parallel to the incident surface, the reflective surface, and the outgoing surface is a thickness direction, the curved surface is an arc in a cross-sectional shape perpendicular to the thickness direction, and the reflective surface is a plane disposed such that a point symmetric to the light source with respect to the reflective surface coincides with a center point of the arc in the cross-sectional shape perpendicular to the thickness direction.

With the above configuration, the reflective surface is a plane, thus facilitating the manufacturing of the light guide member.

The light guide member according to one aspect of the present invention includes: a plurality of the incident surfaces; and a plurality of the reflective surfaces respectively corresponding to the plurality of the light sources, and the light reflected by each of the reflective surfaces is emitted from a different area of the outgoing surface.

With the above configuration, the incident surface can be disposed at a position close to the light guide plate, and the depth of the light guide member can be shortened.

The light guide member according to one aspect of the present invention includes a light limiter configured to limit a range of the light having entered from the incident surface such that light having entered from each of the plurality of the incident surfaces is applied only to the corresponding reflective surface. With the above configuration, the generation of stray light can be prevented.

In the light guide member according to one aspect of the present invention, a reflective layer is formed on at least a part of the reflective surface. With the above configuration, a reflective surface having a desired function can be formed.

In the light guide member according to one aspect of the present invention, the reflective surface is formed such that a straight line connecting an arbitrary point of the reflective surface and the light source intersects with the reflective surface only at the arbitrary point.

With the above configuration, all the light emitted from the light source can be applied to the reflective surface, so that the light can be emitted in all the areas of the outgoing surface in the cross-section perpendicular to the thickness direction.

The light guide member according to one aspect of the present invention includes the incident surface being only one incident surface, wherein a distance until the light reflected by the reflective surface reaches the outgoing surface becomes shorter as a position at which the light is reflected by the reflective surface becomes more distant from the light source.

With the above configuration, the depth of the light guide member can be shortened.

In the light guide member according to one aspect of the present invention, the reflective surface includes a first reflective surface that totally reflects at least some of the light having entered from the incident surface, and a second reflective surface that totally reflects at least some of the light totally reflected by the first reflective surface.

With the above configuration, the reflective surface can reflect incident light without the need to form a reflective layer by metal vapor deposition or the like.

The lighting device according to one aspect of the present invention includes the light guide member and at least one light source. With the above configuration, the lighting device can provide the incident surface of the light guide plate with parallel light collimated in a direction having a constant incident angle.

A display device according to one aspect of the present invention includes: the lighting device; and a light guide plate configured to guide light having entered from the lighting device, reflect the light by an optical path changing part formed at a predetermined position, and emit the light from a light exit surface. With the above configuration, the display device can form a stereoscopic image or a planar image as intended.

The display device according to one aspect of the present invention further includes: the lighting device; and a connector provided between the connector and the light guide plate and configured to change a traveling direction of light emitted from the lighting device, and the connector has a curvature in the traveling direction of the light emitted from the lighting device.

With the above configuration, the direction in which the light reflected by the reflective surface is guided and the direction in which the light travels in the light guide plate can be made different.

In the display device according to one aspect of the present invention, a value obtained by dividing a curvature radius of the curvature by the thickness of the light guide plate is 3 or more.

With the above configuration, the light changed in its traveling direction in the connector can enter the light guide plate without leaking to the outside in the connector.

In the display device according to one aspect of the present invention, the light guide plate forms an image in a space excluding the light guide plate with the light that is emitted from the light exit surface. With the above configuration, the display device can form a stereoscopic image as intended.

In the display device according to one aspect of the present invention, the light guide plate displays a planar image inside the light guide plate with the light that is emitted from the light exit surface. With the above configuration, the display device can display the planar image.

The present invention is not limited to each of the embodiments described above but can be subjected to a variety of changes in the scope illustrated in the claims. An embodiment obtained by appropriately combining technical means disclosed respectively in different embodiments is also included in a technical scope of the present invention.

DESCRIPTION OF SYMBOLS 1 to 5 display device
12 to 17 lighting device
11, 110 light guide plate
22 light source 120, 130, 140, 150, 160, 170 light guide member
113, 116, 117 optical path changing part (optical path changing part group)
116a, 121, 131, 141, 151, 161, 171 reflective surface
115a, 122, 132, 142, 152, 162, 172 outgoing surface
11A, 115c, 123, 133, 143, 153, 163, 173 incident surface
144 light limiter

The invention claimed is:

1. A light guide member comprising:
an incident surface where light from a light source enters;
at least one reflective surface configured to reflect the light entering from the incident surface; and
an outgoing surface formed of a curved surface and configured to emit the light reflected by the reflective surface, wherein
the incident surface is disposed adjacent to the outgoing surface, and
the reflective surface reflects the light entering from the light source in a direction in which an incident angle of the light incident on the outgoing surface is constant.

2. The light guide member according to claim 1, wherein the reflective surface reflects the light entering from the light source in a direction perpendicular to the outgoing surface.

3. The light guide member according to claim 2, wherein the reflective surface comprises a plurality of surfaces, each of which reflects the light entering from the incident surface at a different angle.

4. The light guide member according to claim 2, wherein when a direction parallel to the incident surface, the reflective surface, and the outgoing surface is a thickness direction, the curved surface is an arc in a cross-sectional shape perpendicular to the thickness direction, and
the reflective surface is a plane disposed such that a point symmetric to the light source with respect to the reflective surface coincides with a center point of the arc in the cross-sectional shape perpendicular to the thickness direction.

5. The light guide member according to claim 2, comprising:
a plurality of incident surfaces; and
a plurality of the reflective surfaces respectively corresponding to the plurality of incident surfaces,
wherein the light reflected by each of the reflective surfaces is emitted from a different area of the outgoing surface.

6. The light guide member according to claim 1, wherein the reflective surface comprises a plurality of surfaces, each of which reflects the light entering from the incident surface at a different angle.

7. The light guide member according to claim 6, comprising:
a plurality of incident surfaces; and
a plurality of the reflective surfaces respectively corresponding to the plurality of incident surfaces,
wherein the light reflected by each of the reflective surfaces is emitted from a different area of the outgoing surface.

8. The light guide member according to claim 1, wherein when a direction parallel to the incident surface, the reflective surface, and the outgoing surface is a thickness direction, the curved surface is an arc in a cross-sectional shape perpendicular to the thickness direction, and
the reflective surface is a plane disposed such that a point symmetric to the light source with respect to the reflective surface coincides with a center point of the arc in the cross-sectional shape perpendicular to the thickness direction.

9. The light guide member according to claim 1, comprising:
a plurality of incident surfaces; and
a plurality of the reflective surfaces respectively corresponding to the plurality of incident surfaces,
wherein the light reflected by each of the reflective surfaces is emitted from a different area of the outgoing surface.

10. The light guide member according to claim 9, comprising a light limiter configured to limit a range of the light entering from the incident surface such that light entering from the plurality of incident surfaces is applied only to the corresponding reflective surface.

11. The light guide member according to claim 1, wherein a reflective layer is formed on at least a part of the reflective surface.

12. The light guide member according to claim 1, wherein the reflective surface is formed such that a straight line connecting an arbitrary point of the reflective surface and the light source intersects with the reflective surface only at the arbitrary point.

13. The light guide member according to claim 1, comprising the incident surface being only one incident surface,
wherein a distance until the light reflected by the reflective surface reaches the outgoing surface becomes shorter as a position at which the light is reflected by the reflective surface becomes more distant from the light source.

14. The light guide member according to claim 1, wherein the reflective surface comprises a first reflective surface that totally reflects at least some of the light entering from the incident surface, and a second reflective surface that totally reflects at least some of the light totally reflected by the first reflective surface.

15. A lighting device comprising:
the light guide member according to claim 1; and
at least one light source.

16. A display device comprising:
the lighting device according to claim 15; and
a light guide plate configured to guide light entering from the lighting device, reflect the light by an optical path changing part formed at a predetermined position, and emit the light from a light exit surface.

17. The display device according to claim 16, further comprising:
the lighting device; and
a connector provided between the connector and the light guide plate and configured to change a traveling direction of light emitted from the lighting device,
wherein the connector has a curvature in the traveling direction of the light emitted from the lighting device.

18. The display device according to claim 17, wherein a value obtained by dividing a curvature radius of the curvature by a thickness of the light guide plate is 3 or more.

19. The display device according to claim 16, wherein the light guide plate forms an image in a space excluding the light guide plate with the light that is emitted from the light exit surface.

20. The display device according to claim 16, wherein the light guide plate displays a planar image inside the light guide plate with the light that is emitted from the light exit surface.

* * * * *